United States Patent
Hardy et al.

(10) Patent No.: US 6,370,251 B1
(45) Date of Patent: Apr. 9, 2002

(54) TRAFFIC KEY ACCESS METHOD AND TERMINAL FOR SECURE COMMUNICATION WITHOUT KEY ESCROW FACILITY

(75) Inventors: Douglas Allan Hardy, Scottsdale; Douglas Matthew East, Mesa, both of AZ (US)

(73) Assignee: General Dynamics Decision Systems, Inc., Scottsdale, AZ (US)

(*) Notice: Subject to any disclaimer, the term of this patent is extended or adjusted under 35 U.S.C. 154(b) by 0 days.

(21) Appl. No.: 09/093,083

(22) Filed: Jun. 8, 1998

(51) Int. Cl.$^7$ ................................................. H04L 1/00
(52) U.S. Cl. ........................................................ 380/286
(58) Field of Search .................................. 380/277, 286

(56) References Cited

U.S. PATENT DOCUMENTS

| | | | |
|---|---|---|---|
| 5,179,591 A | 1/1993 | Hardy et al. | 380/21 |
| 5,241,597 A | * 8/1993 | Bright | 380/21 |
| 5,341,427 A | 8/1994 | Hardy et al. | 380/21 |
| 5,557,346 A | 9/1996 | Lipner et al. | 380/21 |
| 5,745,573 A | 4/1998 | Lipner et al. | 380/21 |

OTHER PUBLICATIONS

Bruce Schneier, Applied Cryptography, p. 32, table of contents, Oct. 1995.*

Article entitled, "Cryptography Overview: Single-Key, Public-Key, and Key Escrow", Dorothy Denning, Georgetown University (Jun. 1, 1994).

* cited by examiner

*Primary Examiner*—Emmanuel L. Moise
*Assistant Examiner*—James Seal
(74) *Attorney, Agent, or Firm*—Jenner & Block, LLC

(57) ABSTRACT

Key escrow is achieved without a key escrow facility. An escrow key pair is generated and stored in the terminal. A key escrow field that includes a traffic key encrypted with the escrow key is provided before encrypted traffic is communicated. When access to the traffic key is authorized, the escrow key is extracted from the terminal and used to decrypt the traffic key. The private portion of the escrow key is covered in the terminal with an escrow key access number. The escrow key access number is preferably generated by the terminal manufacturer with a secret algorithm using the terminal serial number. Alternatively, the escrow key is stored within a user token, rather than the terminal.

23 Claims, 3 Drawing Sheets

TRAFFIC KEY ACCESS METHOD AND TERMINAL FOR SECURE COMMUNICATION WITHOUT KEY ESCROW FACILITY

LICENSE RIGHTS

The U.S. Government has a paid-up license in this invention as provided for by the terms of Subcontract No. MDA-904-96-C-P031.

FIELD OF THE INVENTION

This invention relates in general to the field of secure communication and cryptography, in particular to key management and more particularly to cryptographic secure communication and key escrow.

BACKGROUND OF THE INVENTION

Government agencies may need access to encryption keys of users or organizations for court-authorized law enforcement purposes. However, because of privacy and efficiency issues, it is desirable for private businesses or individuals to maintain their encryption keys for their employees and customers and to allow for emergency key recovery. It is also desirable to allow access by the government agencies only when such access is authorized by the courts.

Typically, key escrow is achieved through the assignment of a key management infrastructure (KMI) pair to the terminal. The terminal encrypts the traffic key with the public KMI key and sends out the encrypted traffic key in a key escrow field along with the encrypted traffic. The KMI keys are stored at a key escrow facility. Law enforcement agencies with a valid court order may obtain the KMI private and public keys from the key escrow facility. The KMI private and public keys are used to decrypt the key escrow field obtaining the traffic key, which in turn is used to decrypt the encrypted traffic.

This typical approach has several drawbacks. For example, a separate escrow facility is required and must be maintained. The terminal manufacture and escrow facility operator may have liability for providing and maintaining the KMI keys. Because the KMI keys are in the hands of a third party, users communications are potentially less secure reducing user confidence. A key escrow facility requires additional infrastructure beyond the communication terminals. Furthermore, the typical key escrow facility approach discourages user terminals from changing and generating their own KMI keys because of the authentication required in providing such keys to the key escrow facility.

The typical key escrow facility approach has other disadvantages. For example, the user is not aware of compromised transmissions when the KMI keys are compromised. Also foreign governments do not want secure terminals with key escrow in U.S. KMI facilities. Additionally, it is difficult to remove the ability to decrypt traffic after a court order for such access expires.

Accordingly, what is needed are a method and apparatus that provides access by the government to an encryption key pursuant only to a valid court order. What is also needed is an apparatus and method that allows law enforcement agencies to decrypt encrypted communications without a separate key escrow facility. What is also needed is an apparatus and method that allows a user terminal to generate it's own KMI keys and reduces and possibly eliminates manufacturer liability for escrowing such keys. What is also needed is a method and apparatus that eliminates access to decrypted traffic after a court order has expired.

BRIEF DESCRIPTION OF THE DRAWINGS

The invention is pointed out with particularity in the appended claims. However, a more complete understanding of the present invention may be derived by referring to the detailed description and claims when considered in Connection with the figures, wherein like reference numbers refer to similar items throughout the figures, and:

Figure 1:
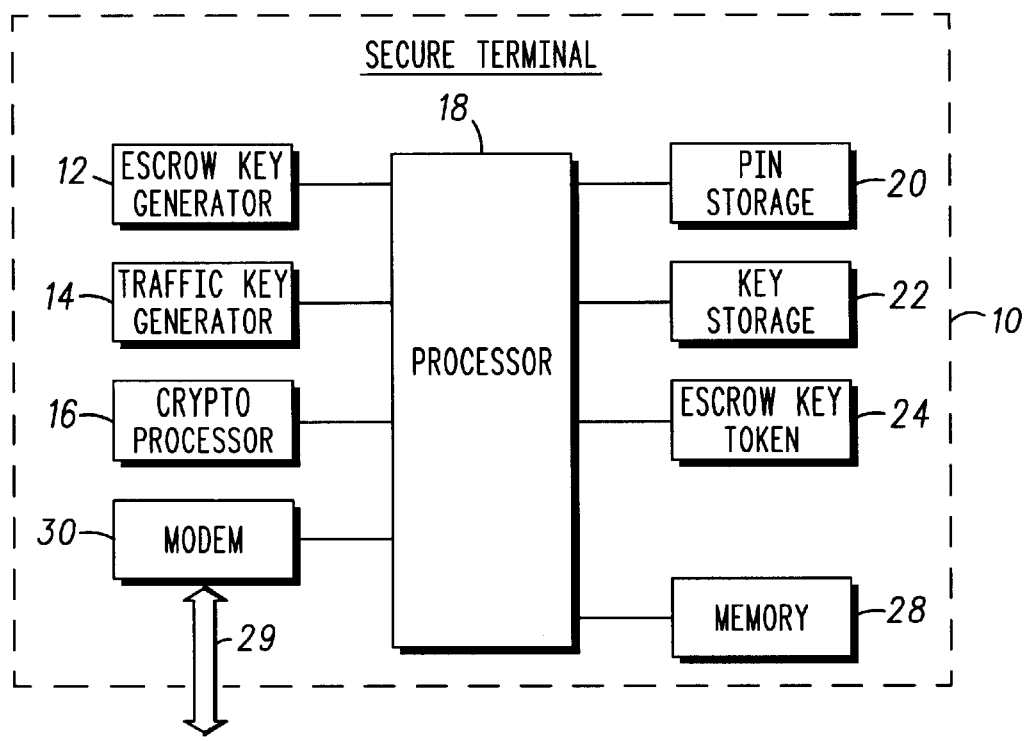
FIG. 1 is a simplified block diagram of a communication terminal in accordance with a preferred embodiment of the present invention.

The exemplification set out herein illustrates a preferred embodiment of the invention in one form thereof, and such exemplification is not intended to be construed as limiting in any manner.

DETAILED DESCRIPTION OF THE DRAWINGS

In accordance with the preferred embodiments, key escrow is achieved without a KMI facility. An escrow key pair (KMI keys) is generated and stored in the communication terminal. A key escrow field that includes a traffic key encrypted with the escrow key is provided when encrypted traffic is communicated. The key escrow field desirably includes, among other things, terminal serial number, time and date and parity information. When access to the traffic key is authorized, the private portion of the KMI key, and preferably the public portion, is extracted from the terminal and used to decrypt the traffic key. In a preferred embodiment, the KMI private key pair portion is preferably covered in the terminal with an access number (or PIN) generated by the terminal manufacturer. The PIN is preferably generated with a secret algorithm using, for example, the terminal serial number.

In an alternative embodiment, the private portion of the KMI key, and preferably the public portion, are stored in a user token, rather than the terminal. In this embodiment, the public portion of the KMI key is at least stored in the user terminal.

The present invention is described in three preferred embodiments. In embodiment number one, escrow keys are generated external to the communication terminals. In this embodiment, the escrow key pair is put on a token for storage and shipped to the user. The user is responsible for the token containing the escrow key pair. The advantage to this embodiment is that the token is protected by the user and that the terminal does not have the private key portion of the escrow key pair.

In embodiment number two of the present invention, escrow keys are generated by the terminal The private portion of the escrow key pair is covered with an access number and stored in the terminal. In this embodiment, the access number is preferably generated external to the terminal and is provided to the terminal for the purpose of encrypting the escrow key pair. The access number may remain with the terminal for the purpose of uncovering the public key portion of the escrow key (if covered) and to allow future access to the terminal for the purpose of extracting the escrow key pair. In this embodiment of the present invention, a user may change the escrow key pair as desired. An advantage to this embodiment is that the access number is entered into the terminal to extract at least the private portion of the escrow key pair. When a court order is obtained for the escrow keys, the terminal manufacturer may regenerate the access number for that terminal.

The third embodiment of the present invention is similar to the second embodiment wherein, the escrow key pair is generated by the terminal. However, the key access number is not stored in the terminal. An advantage to this embodiment of the present invention, is that since the key access number is not stored within the terminal, no effort to extract the escrow keys or the key access numbers would be attempted on the terminal.

FIG. 1 is a simplified block diagram of a communication terminal in accordance with a preferred embodiment of the present invention. Secure terminal 10 is preferably a typical secure communication terminal including the functional elements shown in FIG. 1 and suitably for performing the processes and steps described in the figures that follow. Secure terminal 10 includes escrow key generator 12, traffic key generator 14, cryptographic processor 16, processor 18, PIN storage 20, key storage 22, and memory 28. Secure terminal 10 preferably includes the capability of receiving escrow key token 24. Escrow key generator 12 generates escrow keys (e.g., KMI keys) which are used for key escrow described below. Traffic key generator 14 generates the traffic variable (or keys) that are used for encrypting communication traffic. Traffic key generator 14 generates both symmetric and asymmetric keys. Cryptographic processor 16 is preferably used for implementing selected cryptographic algorithms using particular keys. Examples of cryptographic algorithms including RSA, DES, and elliptic curve. Processor 18 manages the tasks performed by secure terminal 10 including call set-up and other background procedures that run in secure terminal 10.

PIN storage 20 is included preferably in the second embodiment of the present invention, but not in the third embodiment. PIN storage 20 preferably is a non-volatile memory for storing the key access numbers which may be generated by the terminal manufacturer. Key storage 22 is preferably a non-volatile memory that stores escrow key pairs generated by escrow key generator 12 and traffic keys generated by traffic key generator 14. The key access number is preferably a symmetric encryption key.

Escrow key token 24 is preferably included in the first embodiment of the present invention, and preferably stores the private portion of the escrow key. Escrow key token 24 preferably also stores the public portion of the escrow key. In accordance with this first embodiment of the present invention, escrow key generator 12 is not required.

Optional modem 30 performs typical modem tasks and is suitable for communicating with, among other things, other secure terminals and networks through port 29. Modem 30 is not required for digital communication, and port 29 provides for direct digital communication with terminal 10. Memory 28 includes, among other things, operating instructions for terminal 10 which are executed by processor 18, and preferably includes a selection of cryptographic programs and algorithms for processing by cryptographic processor 16.

Figure 2:
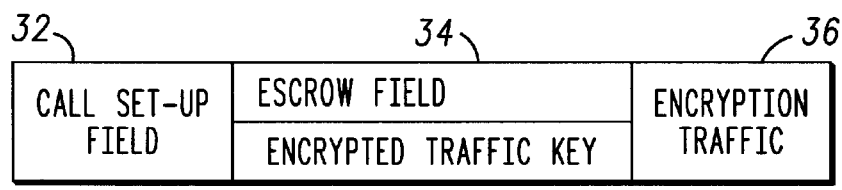
FIG. 2 is a simplified diagram of information exchanged between communication terminals in accordance with the preferred embodiments of the present invention.

FIG. 2 is a simplified diagram of information exchanged between communication terminals in accordance with the preferred embodiments of the present invention. When secure terminals wish to communicate, call set-up information 32 is exchanged between the terminals. One purpose of the call set-up procedures is to negotiate traffic keys for encrypting communications between the terminals. Preferably, traffic keys are established on a per call basis. Among other things, during the call set-up process, equipment capability is exchanged along with the designation of a particular encryption algorithm. Furthermore, as part of the call set-up process, authentication messages are exchanged between the terminals where both parties preferably exchange digital certificates which are digitally signed to verify the party's identity. Furthermore, the call set-up process may also include a crypto-sync for terminals synchronization to a position in a cryptographic algorithm.

In addition, as part of the information exchanged between terminals prior to transmitting encrypted traffic, key escrow field 34 is exchanged between the terminals. The key escrow field contains the traffic key encrypted with the escrow key. This is discussed in more detail below. After call set-up and exchange of the escrow field, encrypted traffic 36 is exchanged between terminals. Encrypted traffic may be decrypted with the traffic key provided in escrow field 34. However, obtaining the traffic key from escrow field 34 requires the private portion of the escrow key which is either stored in key storage 22 (FIG. 1) or token 24 of the sending terminal. Obtaining the traffic key from escrow field 34 may also require the public portion of the escrow key which is preferably either stored in key storage 22 (FIG. 1) or token 24 of the sending terminal.

The following U.S. Patents describe suitable communication terminals and call set-up procedures for use in the present invention; U.S. Pat. No. 5,341,427 dated Aug. 23, 1994 entitled, "Algorithm Independent Cryptographic Key Management Apparatus" and U.S. Pat. No. 5,179,591 dated Jan. 12, 1993 entitled, "Method for Algorithm Independent Cryptographic Key Management". The above noted patents are incorporated herein by reference.

Figure 3:
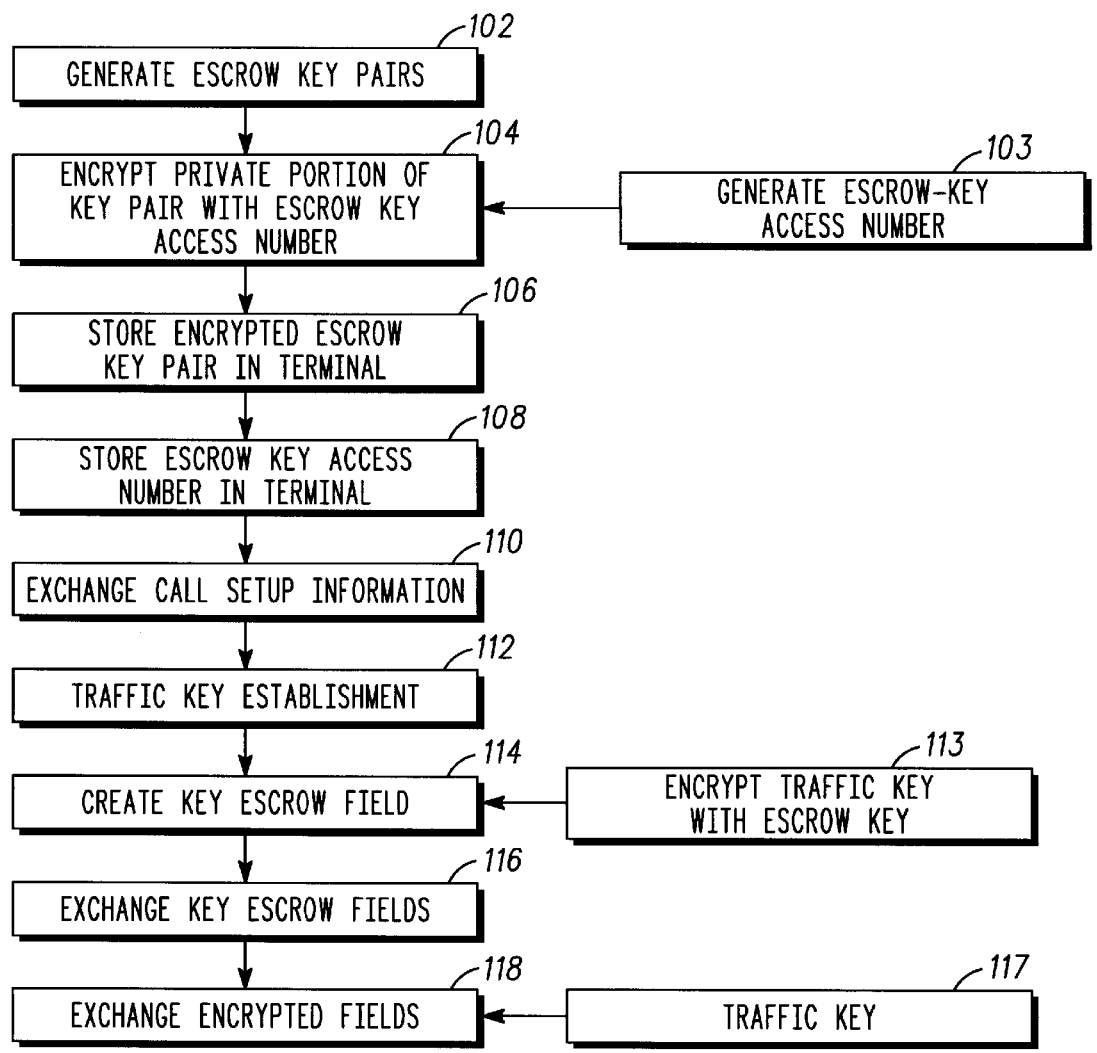
FIG. 3 illustrates a simplified key escrow procedure in accordance with a preferred embodiment of the present invention.

FIG. 3 illustrates a simplified key escrow procedure in accordance with a preferred embodiment of the present invention. Tasks 102–108 are preferably performed at a time of terminal manufacture. In task 102, the escrow key pair for a terminal is generated. In accordance with the first embodiment of the present invention, the escrow key pair is generated at a separate facility, such as a KMI facility, or at the terminal manufacturer and is installed on a token. The token may be shipped to a user for storage and subsequent use with a terminal. In accordance with the second and third embodiments of the present invention, the escrow key pair is generated in task 102 by the terminal and stored within the terminal.

Tasks 103 and 104 are performed for the second and third embodiments of the present invention. The first embodiment of the present invention refrains from performing tasks 103 and 104. In task 103, a key access number is generated. In the preferred embodiment, the key access number is an encryption key or alternatively as a number that is used by the terminal to generate the encryption key. In one example, a random key access number for each terminal may be generated. In this case, the terminal manufacturer would archive key access numbers for all manufactured terminals. Alternatively, the key access number is generated using a secret function which transforms, for example, the terminal serial number into the escrow key access number. Accordingly, the manufacturer may delete or erase the key access number after it has been provided to the terminal and there is no need for the manufacturer to maintain a database of key access numbers for each terminal, because when an escrow key access number is needed in the future, it may be regenerated by the manufacturer by translating a public variable such as the terminal serial number using a secret function known only to the manufacturer.

In task 104, the escrow key pair is encrypted with a key access number, such as a PIN. The key access number is preferably a symmetric key. Preferably, only the private portion of the escrow key pair is encrypted with the key access number. The key access number is stored in the terminal and used to encrypt the private portion of the escrow key pair.

In task 106, the encrypted escrow key pair is stored in the terminal, preferably in non-volatile memory. In accordance with the first embodiment of the present invention, task 106 stores only the public portion of the escrow key pair (the private portion, and preferably the public portion remain in the token).

In task 108, the escrow key access number is stored in the terminal. The first and third embodiments of the present invention refrain from performing task 108.

The following tasks are preferably performed by a communication terminal prior to engaging in the communication of secure traffic. In task 110, communication terminals exchange call set-up information. For example, as part of task 110, traffic keys are generated. In task 112, a traffic key for the call is established. In task 114, the communication terminal creates the key escrow field which includes the traffic key encrypted with the public portion of the escrow key pair (task 113). In task 116, the communication terminal exchange key escrow fields and in task 118 encrypted traffic is exchanged between the terminals. Traffic is encrypted with the traffic key (117) established in task 112.

Figure 4:
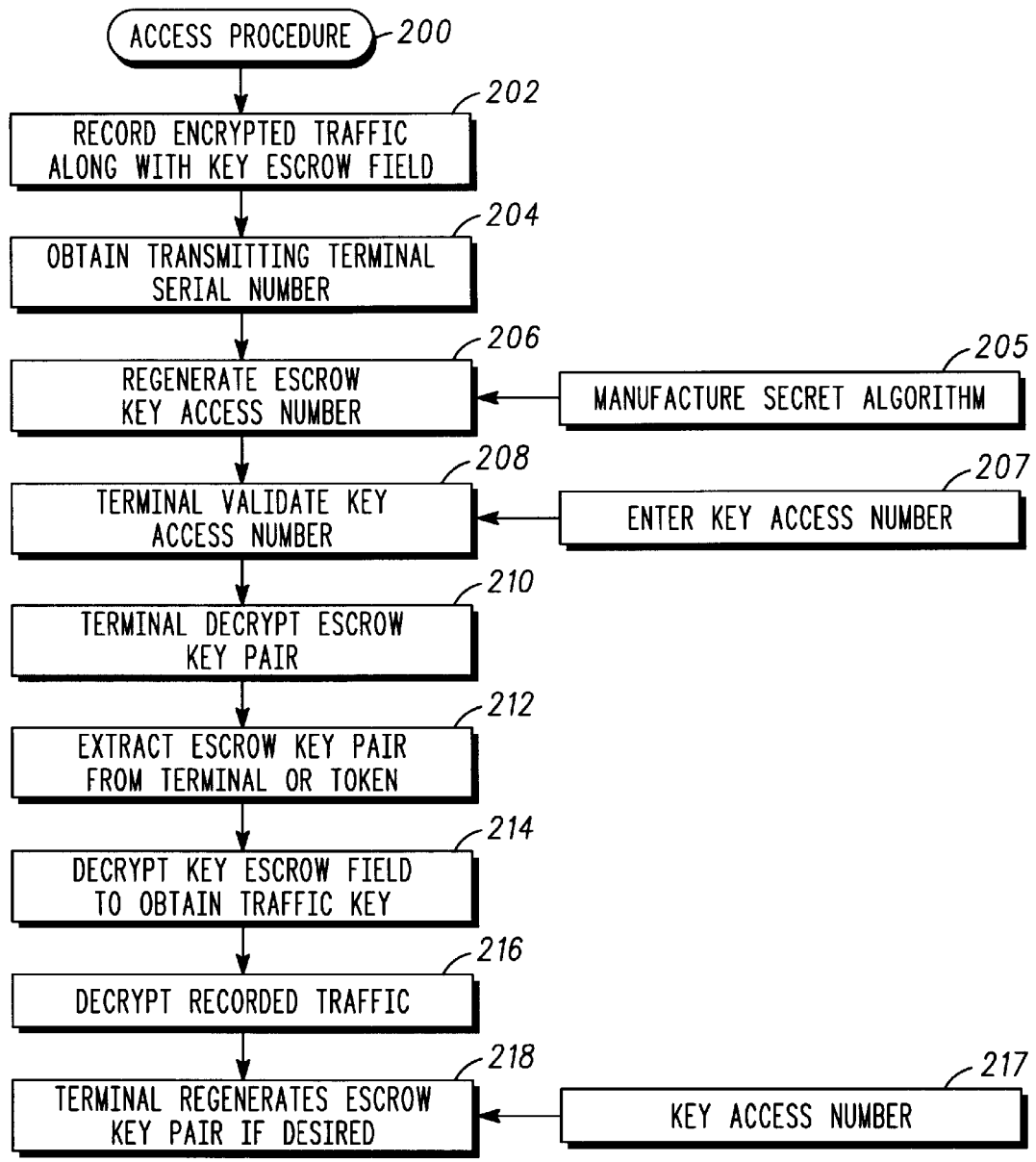
FIG. 4 illustrates a simplified key access procedure in accordance with a preferred embodiment of the present invention.

FIG. 4 illustrates a simplified key access procedure in accordance with a preferred embodiment of the present invention. Access procedure 200 is performed when access is desired to encrypted traffic. In task 202, encrypted traffic is recorded along with a key escrow field. The recording is performed by a party with authorization to do so, such as a government agency with a court order. As part of task 202, the encrypted traffic and key escrow field are stored for later processing. In task 204, the terminal serial number which transmitted the encrypted traffic is obtained. In accordance with first embodiment of the present invention, the token that has the escrow key stored thereon must be obtained. In accordance with second and third embodiments of the present invention, the terminal that has the escrow key stored therein is obtained.

After task 204, in accordance with the first embodiment of the present invention, task 212 is performed. The first embodiment of the present invention refrains from performing tasks 206–210.

In accordance with the second and third embodiments of the present invention, in task 206, the escrow key access number is regenerated. In the preferred embodiments, the terminal serial number is presented to the manufacturer of the terminal along with a valid court order for access to the key access number. In task 205, the escrow key access number is regenerated, preferably by the terminal manufacturer, using the terminal serial number and a secret algorithm of the manufacturer. Alternatively, the manufacturer may have a database of key access numbers for each terminal.

In task 207, the key access number is provided to the terminal and in task 210, the terminal uses the key access number to decrypt the encrypted escrow key pair. Alternatively, the key access number is used to decrypt the private portion of the escrow key pair stored in the terminal.

In the second embodiment of the present invention where a key access number is stored in the terminal, task 208 validates the escrow key access number. If the escrow key access number does not match the escrow key access number stored within the terminal, task 210 is not performed.

In accordance with the third embodiment of the present invention, the key escrow access number is not stored within the terminal, and accordingly, task 208 is not performed. However, in task 210, the escrow key pair is not decrypted properly and cannot be obtained when an incorrect of invalid key access number is entered in task 207.

In task 212, the escrow key pair is extracted from the terminal. In accordance with the first embodiment of the present invention, the escrow key pair is extracted from the token. A token reader may be used, or alternatively, the secure terminal may be used to perform task 212. In accordance with the second and third embodiment of the present invention, the escrow key pair is extracted from the terminal after being decrypted in task 210.

In task 214, the key escrow field which was recorded in task 202, is decrypted using the escrow key pair extracted in task 212. Accordingly, the traffic key for the particular communication is obtained.

In task 216, the encrypted traffic is decrypted with the obtained traffic key. Real-time access to encrypted traffic may be obtained, for example, until the escrow key pair is regenerated by the terminal. In accordance with the second and third embodiments of the present invention, the communication terminal regenerates the escrow key pair, if desired in task 218. Task 218 corresponds with task 102 of procedures 100 (FIG. 3). Entering the key access number (217) is preferably required to regenerate the escrow key pair in 218.

Advantages to embodiments of the present invention include location of the escrow keys in the terminal that uses it and no where else. Another advantage to the present invention is that the escrow key access number is created at the manufacturer using a secret generating function. In the second embodiment, for example, only the user terminal has the escrow key pair and the escrow key access number. There is preferably no record of the escrow key access number external to the user terminal. Another advantage is that the user has the option of regenerating the escrow key pair to ensure that future traffic is not compromised. Another advantage to the embodiments present invention is that two levels of security must be breached prior to compromising the user terminal; both the manufacturer's secret algorithm and the user terminal itself.

Another advantage to the present invention is that no escrow key facility is needed and liability of the manufacturer and the key escrow facility that is associated with handling escrow keys is substantially removed. Another advantage to certain embodiments of the present invention is that physical access to the terminal is required to obtain the escrow keys which increases user confidence that their communications are secure. Another advantage to the present invention is that the terminal user may provide the appropriate level of security that is desired. For example, the terminal may be secured/locked away when not in use or left in the open when security is not a concern. Another advantage to the present invention is that the user, at the user's option provides physical protection for their terminal and unlike a key escrow facility, the user knows the level of protection provided. Another advantage to the present invention is that it may permit the equipment to be sold to non-United States customers who do not want their keys stored in a U.S. key escrow facility. Another advantage to certain embodiments of the present invention is that the user may change the escrow keys when desire. For example, the user may regenerate the escrow key pair. Another advantage to the present invention is that access to the encrypted traffic after a court order has expired can be prevented.

Although the preferred embodiment of the invention has been illustrated, and that form described in detail, it will be readily apparent to those skilled in the art that various modifications may be made therein without departing from the spirit of the invention or from the scope of the appended claims.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for recovering secure communication using a key escrow method which provides for the recovery of a traffic key which enables the recovery of plain traffic from encrypted traffic;

comprising the steps of:

generating (102) in a terminal an escrow key pair including a private portion and a public portion;

providing an escrow key access number to the terminal, such escrow key access number being known only to an operator;

encrypting (104) in the terminal the private portion with the escrow key access number to form an encrypted private portion;

storing (106) the public portion and the encrypted private portion within the terminal;

generating a key escrow field including a traffic key encrypted (113) with the public portion of the escrow key pair;

communicating (116) the key escrow field to another terminal; and communicating (118) the traffic encrypted with the traffic key to another terminal.

2. A method as claimed in claim 1 wherein the storing step comprises the step of storing the public portion and the encrypted private portion of the escrow key pair within a non-volatile memory of the terminal.

3. A method as claimed in claim 1 further comprises the step of storing (108) the escrow key access number in non-volatile memory of the terminal.

4. A method as claimed in claim 1 wherein the generating the escrow key access number step comprises the step of generating the escrow key access number using a public variable and using an algorithm of a manufacturer of the terminal.

5. A method as claimed in claim 4 wherein said public variable is a serial number of the terminal and said algorithm is not a publicly known algorithm.

6. A method as claimed in claim 1 wherein the generating the escrow key pair step is performed by a manufacturer of the terminal, and wherein the method further comprises the step of the manufacturer:

generating the escrow key access number;

encrypting the private portion of the escrow key pair with the escrow key access number; and storing the public portion and the encrypted private portion of the escrow key pair within a non-volatile memory of the terminal.

7. A method as claimed in claim 6 further comprises the step of storing (108) the escrow key access number in the terminal.

8. A method as claimed in claim 1 further comprises the step of establishing (112) the traffic key with the other terminal for subsequent secure communication.

9. A method as claimed in claim 8 wherein the traffic key is a symmetric encryption key.

10. A method as claimed in claim 8 wherein the traffic key is a asymmetric encryption key and wherein the communicating traffic step includes the step of encrypting the traffic with a public portion of said traffic key, and wherein the communicating the key escrow field step comprises the step of communicating the key escrow field to the other terminal, the key escrow field including a private portion of the traffic key encrypted (113) with the public portion of the escrow key pair.

11. A method as claimed in claim 1 further comprising the step of decrypting the encrypted traffic, the decrypting the encrypted traffic step including the steps of:

obtaining the escrow key access number for the secure terminal;

decrypting the encrypted private portion of the escrow key pair with the escrow key access number to obtain the private portion;

decrypting the encrypted traffic key with the private portion of the escrow key pair to obtain the traffic key; and using the traffic key to decrypt the encrypted traffic.

12. A method as claimed in claim 11 further comprising the steps of:

generating a new escrow key pair in response to the decrypting the encrypted private portion step; and repeating the steps of encrypting, storing and communicating the key escrow field using the new escrow key pair and a new escrow key access number.

13. A method as claimed in claim 11 wherein the obtaining step includes the steps of:

determining a serial number of the terminal; and generating the escrow key access number using a public variable and a non-public algorithm.

14. A method as claimed in claim 13 wherein the generating the escrow key access number step, the escrow key access number is generated with the public variable being the serial number of the terminal, and wherein the generating the escrow key access number step is performed by a manufacturer of the terminal in response a court order, and wherein the non-public algorithm.

15. The method as claimed in claim 1 for recovering the plain traffic from the encrypted traffic, comprising the steps of:

obtaining the escrow key access number from the operator;

entering the escrow key access number into a terminal;

using the key access number to decrypt the private portion of the key escrow pair;

extracting the private portion of the escrow key pair from the terminal;

using the private portion to decrypt the key escrow field to recover the traffic key; and using the traffic key to decrypt the encrypted traffic with the traffic key to provide the plain traffic.

16. A method for secure communication and key escrow within a token comprising the steps of:

generating an escrow key pair including a private portion and a public portion by a secure key generating facility;

said secure key generating facility loading said escrow key pair onto the token;

loading the public portion into a terminal;

encrypting a traffic key with the public portion of the escrow key pair;

communicating a key escrow field with another terminal, the key escrow field including the encrypted traffic key therein; and communicating traffic encrypted with the traffic key.

17. A method as claimed in claim 16 further comprising the step of decrypting the encrypted traffic, the decrypting the encrypted traffic step including the steps of:

obtaining the token obtaining the escrow key pair from the token;

decrypting the encrypted traffic key with the private portion of the escrow key pair to obtain the traffic key; and using the traffic key to decrypt the encrypted traffic.

18. A method of accessing encrypted traffic communicated by a terminal, the terminal having an escrow key pair including an encrypted private portion and a public portion stored therein, the method comprising the steps of:

obtaining an escrow key access number for the terminal;

decrypting the encrypted private portion with the escrow key access number to obtain a private portion of the escrow key pair;

decrypting an encrypted traffic key with the private portion of the escrow key pair to obtain a traffic key; and using the traffic key to decrypt the encrypted traffic.

19. A method as claimed in claim 18 wherein the obtaining step includes the steps of:

determining a serial number of the terminal; and generating the escrow key access number using a public variable and a non-public algorithm.

20. A method as claimed in claim 19 wherein the generating the escrow key access number step is performed by a manufacturer of the terminal in response to a court order, the public variable being a serial number of the terminal.

21. A method as claimed in claim 19 further comprising the step of communicating the encrypted traffic, the step of communicating the encrypted traffic comprising the steps of:

the terminal generating the escrow key pair including the private and public portions;

encrypting the private portion with the escrow key access number to form the encrypted private portion;

storing the public portion and the encrypted private portion of the escrow key pair within non-volatile memory of the terminal;

communicating a key escrow field to another terminal, the key escrow field including the traffic key encrypted with the public portion of the escrow key pair; and communicating traffic encrypted with the traffic key.

22. A communication terminal comprising:

an escrow key generator for generating an escrow key pair including a private portion and a public portion;

a cryptographic processor for encrypting the private portion with an escrow key access number to form an encrypted private portion, and for encrypting a traffic key with the public portion of the escrow key pair;

a memory for storing the public portion and the encrypted private portion; and a communication port for communicating a key escrow field to an other terminal, the key escrow field including the encrypted traffic key and for communicating traffic encrypted with the traffic key.

23. A communication terminal as claimed in claim 22 wherein the memory includes non-volatile memory for storing the public portion and the encrypted private portion, and wherein the escrow key access number is generated using a public variable and using an algorithm of a manufacturer of the communication terminal, the public variable being a serial number of the terminal and said algorithm being a publicly unknown algorithm.

* * * * *